United States Patent [19]

Baas

[11] Patent Number: 5,450,388

[45] Date of Patent: Sep. 12, 1995

[54] METHOD FOR CORRECTING TRACKING ERRORS IN A DISC RECORD REPRODUCTION APPARATUS

[75] Inventor: Dieter Baas, Kehl-Auenheim, Germany

[73] Assignee: Deutsche Thomson-Brandt GmbH, Villingen-Schwenningen, Germany

[21] Appl. No.: 102,878

[22] Filed: Aug. 6, 1993

Related U.S. Application Data

[63] Continuation of PCT/EP92/00239, Feb. 4, 1992.

[30] Foreign Application Priority Data

Feb. 9, 1991 [DE] Germany ............... 41 04 017.1

[51] Int. Cl.$^6$ ............................................. G11B 7/00
[52] U.S. Cl. ................... 369/44.32; 369/44.27; 369/44.78
[58] Field of Search ............. 369/44.32, 44.28, 44.29, 369/32, 44.27, 44.33, 57, 54, 58, 44.34; 250/201.5; 360/75, 77.01, 77.03, 77.04

[56] References Cited

U.S. PATENT DOCUMENTS

| | | | |
|---|---|---|---|
| 4,623,993 | 11/1986 | Schrösser | 369/44.32 X |
| 4,701,897 | 10/1987 | Nakagawa | 369/32 |
| 4,796,247 | 1/1989 | Vogelsang | 369/44.32 |
| 4,821,251 | 4/1989 | Hosoya | 369/58 |
| 5,033,041 | 7/1991 | Schröder | 369/44.32 |
| 5,148,417 | 9/1992 | Wong et al. | 369/32 |

FOREIGN PATENT DOCUMENTS

| | | |
|---|---|---|
| 0139332 | 5/1985 | European Pat. Off. . |
| 0249781 | 12/1987 | European Pat. Off. . |

*Primary Examiner*—Andrew L. Sniezek
*Assistant Examiner*—Thang V. Tran
*Attorney, Agent, or Firm*—Joseph S. Tripoli; Eric P. Herrmann

[57] ABSTRACT

A disc playback apparatus includes a system for scanning a disc and storing in memory, an address associated with every point on the disc where the scanning device mistracks. A modified regulating signal is calculated for guiding the scanning device back onto the desired data track, from the value of the regulating signal generated by the tracking regulation circuit prior to track loss. The modified regulating signal is also stored in the memory, and during every subsequent reading of the disc, upon encountering track areas associated with stored addresses, the tracking regulation circuit is provided a corresponding modified regulating signal in order to maintain the scanning device near the desired data track. In further scans of the disc successive modified track regulating signals are iteratively generated and tested for tracking response until a substantially optimum modified signal is generated. The optimum modified regulating signal is then stored in memory associated with the address of respective disc defects. The optimum regulating signal is determinable by monitoring the polarity of the tracking signal after application of the modified signal. The first occurrence of a polarity change is an indication that the respective iteration of generating a modified signal has produced the desired signal.

12 Claims, 2 Drawing Sheets

METHOD FOR CORRECTING TRACKING ERRORS IN A DISC RECORD REPRODUCTION APPARATUS

This is a continuation application of PCT application PCT/EP92/00239, filed 4 Feb. 1992. The invention relates to a method for reading the data from a rotating disc-type recording medium on which the data are recorded in helical data tracks or in concentric circles and a scanning device is guided along the data tracks by means of a tracking regulation circuit.

BACKGROUND OF THE INVENTION

In, for example, compact disc players, an optical scanning device scans the helical data tracks of a so-called compact disc (CD) by means of a light beam. Using an objective lens, the light beam is focused onto the CD by a focusing regulation circuit. A tracking regulation circuit guides the optical scanning device such that the light beam is always guided along the data tracks of the CD.

Unfortunately, scratches or contamination on the disc, such as dust or fingerprints, impair the reproduction of the recorded information, e,g., music. If the light beam arrives at a point which is contaminated, for example, by dust or a fingerprint, it may run uncontrolled over a number of the data tracks because the data are no longer readable and because the tracking regulation circuit may not reliably generate a regulating signal in the contaminated region of the disc. As soon as the light beam resumes scanning a clean (uncontaminated) data track on the disc, the tracking regulation circuit determines whether the light beam is still focused on the desired data track. Typically it will be displaced by a few data tracks radially inwards or outwards, The tracking regulation circuit now calculates and generates a regulating signal so that the light beam returns to the desired data track to be scanned.

Data located between the point where the light beam left the desired data track and the point to which it is returned is not reproduced. An interruption in the playback of the music can still be avoided within a CD player if the lost data can be bridged over by interpolation. However, if the contaminated or damaged spot on the disc is too large, then the listening enjoyment may be spoiled by a disturbing interruption.

Therefore, it is the object of the invention to design a method whereby data loss caused by contaminated or damaged spots on the recording medium is as small as possible.

SUMMARY OF THE INVENTION

The present invention solves this task by scanning a disc and storing in memory, an address associated with every point on the disc where the scanning device loses the data track. A modified regulating signal is calculated for guiding the scanning device back onto the desired data track, from the value of the regulating signal generated by the tracking regulation circuit prior to track loss. The modified regulating signal is also stored in the memory, and during every subsequent reading of the disc, upon encountering track areas associated with stored addresses, the tracking regulation circuit is provided a corresponding modified regulating signal in order to maintain the scanning device near the desired data track.

In a further embodiment successive modified track regulating signals are iteratively generated and tested for tracking response until a substantially optimum modified signal is generated. The optimum modified regulating signal is then stored in memory associated with the address of respective disc defects. The optimum regulating signal is determinable by monitoring the polarity of the tracking signal after application of the modified signal. The first occurrence of a polarity change is an indication that the respective iteration of generating a modified signal has produced the desired signal.

DETAILED DESCRIPTION

Figure 1:
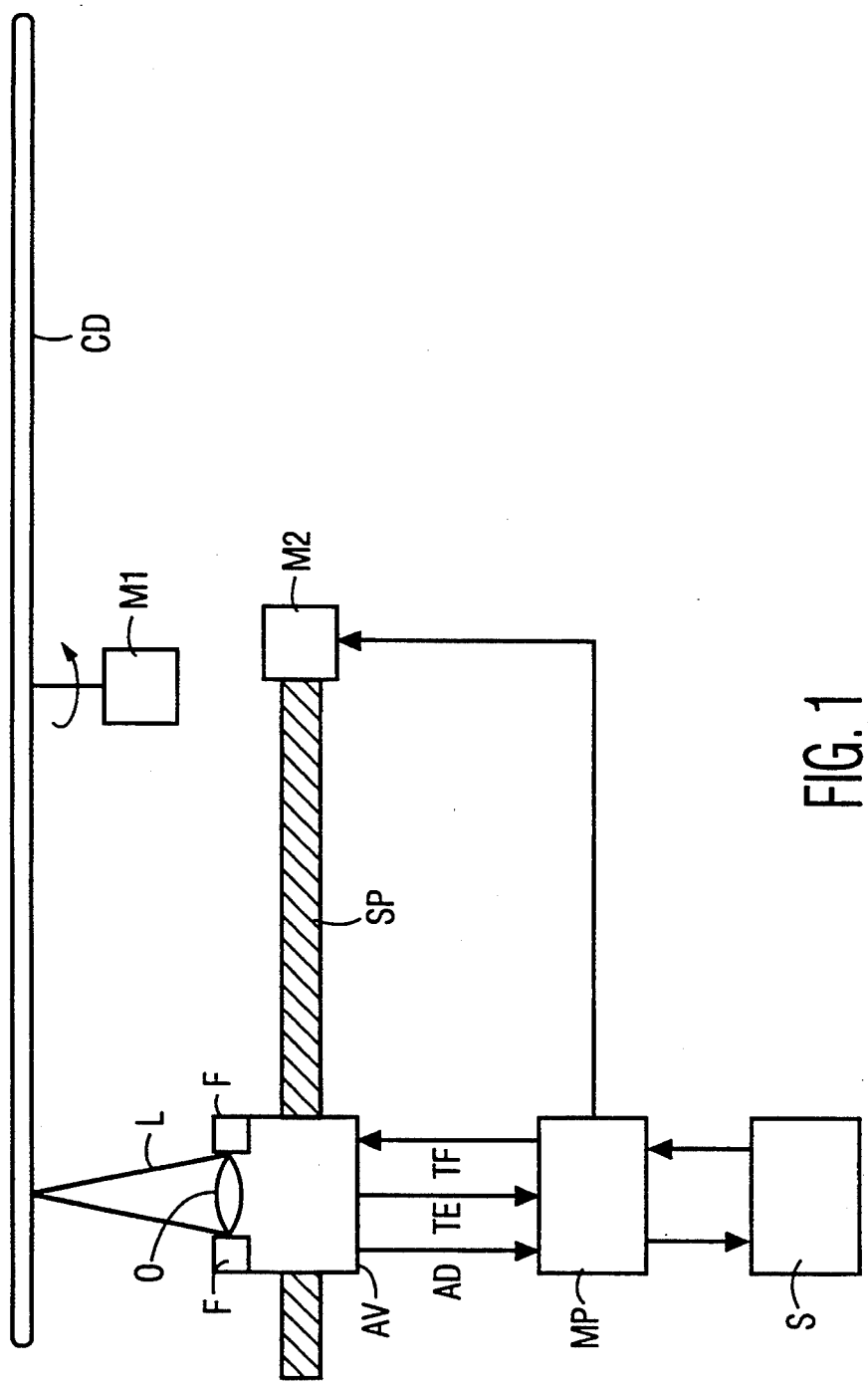
FIG. 1 is partial pictorial and partial block diagram of a playback device for executing the method embodying the invention.

Referring to FIG. 1, a motor M1 rotates a compact disc (CD) which is scanned by an optical scanning device AV by means of a light beam L. The light beam L, is focused onto the CD by means of an objective lens O. Using a fine servomechanism, F, the objective lens O can be moved relative to the scanning device AV a small amount radially inwards or outwards.

The optical scanning device AV is mounted on a spindle SP which is driven by a second motor M2. The second motor M2 effects coarse radial translation of the optical scanning device AV so that the light beam L can be radially displaced across the entire disc either during normal tracking or data searching modes.

In the normal tracking mode, a regulation circuit MP receives a tracking error signal TE from the optical scanning device AV. Responsive to the tracking error signal TE, the regulating circuit MP generates a regulating signal TG for the coarse drive. The fine and coarse drives work together in such a way that the light beam L is guided along the data tracks of the disc. In addition, the optical scanning device AV provides the address AD of each currently scanned point on the disc CD to the regulating circuit MP. If the light beam encounters a contaminated spot, the regulating circuit MP no longer receives a tracking error signal TE. Responsive to the loss of the tracking error signal the regulating circuit MP now causes the address of the last point registered to be stored in the memory S. As soon as the regulating circuit MP regains a tracking error signal TE, it determines the deviation of the light beam L from the desired data track to be scanned, and calculates from this deviation a regulating signal in order to direct the light beam L back onto the desired data track. A modified regulating signal is calculated from this regulating signal and is stored in the memory S as belonging to the stored point.

This process is repeated for each damaged track area on the disc, and the addresses of such track areas and associated modified regulating signals are stored in the memory S.

During subsequent playback, the regulating circuit MP continually compares the addresses of the track data being scanned by the light beam L, with the addresses stored in memory. When an address supplied by the optical scanning device AV is identical to an address stored in the memory S, the regulating circuit MP accesses the associated modified regulating signal from the memory S and applies this signal to the tracking regulation circuit in order to direct the light beam back onto the desired data track as quickly as possible.

In a second further step, each of the stored points is approached by the optical scanning device AV and the associated modified first regulating signal, which is stored in the memory S, is sent to the tracking regulation circuit. The tracking regulation circuit now generates a regulating signal or series of regulating signals in order to direct the light beam L back onto the desired data track. A second modified regulating signal is calculated from this regulating signal or from the current track displacement from the desired track, and the second modified regulating signal is substituted for the first modified regulating signal stored in the memory S.

This second step is repeated for each stored point until either the direction of the tracking deviation or the (preceding) sign of the regulating signal reverses. Then either the modified regulating signal stored immediately in the procedure step before the sign reversal or the modified regulating signal calculated upon reversal of the sign remains in the memory S; it is no longer overwritten by a new modified regulating signal.

During the playback of the CD, every time the light beam L arrives at one of the stored addresses, the regulating circuit MP calls up the associated modified regulating signal from the memory S in order to direct the light beam back onto the desired data track as nearly as possible passed (behind) the contaminated or damaged area.

Figure 2:
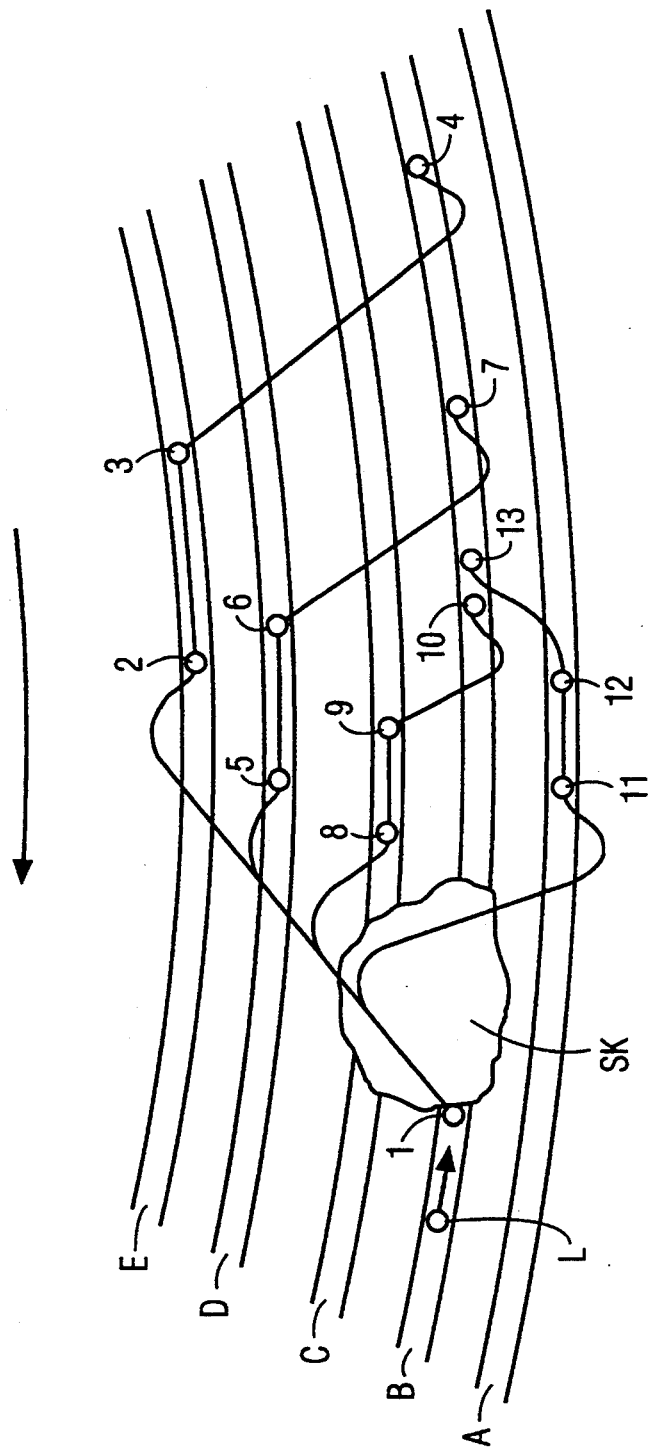
FIG. 2 is a pictorial representation of a section of a compact disc including foreign object giving rise to mistracking.

Refer to FIG. 2 wherein a section of a compact disc CD with five helical data tracks A, B, C, D and E is shown. A grain of dust SK covers a part of the data tracks B and C. The disc rotates in the direction indicated by the arrow. Therefore, the light beam L moves in the direction of the arrow from left to right along the data track B. When the light beam arrives at point 1, no more data can be read owing to the grain of dust SK and, therefore, a tracking error signal TE can no longer be generated. The address of point 1 is stored in the memory S.

However, without the tracking error signal TE, the light beam L tends to run uncontrolled over the data tracks beyond point 1. In FIG. 2 it runs, for example, three data tracks radially inwards to data track E where the tracking regulation circuit recaptures it and guides it on the data track E from point 2 onwards. After a short time, when the light beam is at point 3, the regulating circuit MP has recognized that the light beam is displaced three data tracks too far radially inwards. Responsive to the radial translation it provides a regulating signal to the tracking regulating circuit which guides the light beam to point 4 on the desired data track B which was originally being scanned. A modified regulating signal is calculated from this regulating signal and this is also stored in the memory S with the address of point 1.

All data located between points 1 and 4 on the data track B have not been scanned by the light beam L. The invention is now based on the knowledge that not all data located between points 1 and 4 but only a part thereof are likely to covered by the grain of dust SK.

In accordance with the method of the invention, the modified regulating signal present in the memory S is sent to the tracking regulation circuit when the disc is played back if the light beam again scans point 1 on data track B. The light beam will no longer be shifted to data track E but, for example, only as far as data track D where it is captured by the tracking regulation circuit at point 5. At point 6 on data track D, the regulating circuit MP will again recognize that the light beam has been undesirably translated two data tracks radially inwards. The regulating circuit MP generates a regulating signal to move the light beam from point 6 on data track D to point 7 of the data track B. The area of data which has not been read has been lessened because it now only extends from point 1 to point 7.

Upon initial reading of the data, the light beam moves from point 1 to point 2 further to point 3 and from there to point 4 on data track B. The address of point 1 and the associated first modified regulating signal are stored in the memory S. In a second procedural step, point 1 is approached and the stored first modified regulating signal is sent to the tracking regulation circuit. The light beam L is now captured by the tracking regulation circuit at point 5 on data track D. The regulating circuit MP recognizes at point 6 that the light beam has to be shifted two data tracks radially outwards in order to again intersect data track B. Therefore, it generates a regulating signal to steer the light beam from point 6 on data track D to point 7 on data track B. A second modified regulating signal is calculated from this regulating signal and stored in the memory S.

In a further procedure step, the light beam once again travels to point 1. The tracking regulation circuit now receives the second modified regulating signal stored in the memory S. The light beam L mistracks to point 8 on track C. The regulating circuit MP recognizes the mistracking by point 9 and generates a regulating signal to steer the light beam onto point 10 of the data track B. A third modified regulating signal is calculated from this regulating signal and stored in the memory S.

Point 1 is now approached for a third time by the light beam L. The tracking regulation circuit receives the third modified regulating signal from the memory S. However, the third modified regulating signal now has the effect that the light beam is deflected outwards to data track A. The tracking regulation circuit catches the light beam L and steers it to point 11 of data track A. At point 12 of data track A, the regulating circuit MP, after it has recognized at point 11 that the light beam has been displaced by one data track radially outwards from the data track B, sends a regulating signal to the tracking regulation circuit so that the light beam is directed onto the data track B. However, as with this procedure step the sign of the tracking deviation, and consequently the regulating signal too, has reversed, the third modified regulating signal is not replaced in the memory S.

However, it is also possible to calculate a fourth modified regulating signal from the regulating signal generated last and to store this in the memory S. As in both cases the optimum modified regulating signal is found and stored, the play mode can begin.

When in the play mode the light beam arrives at point 1 on data track B, the regulating circuit MP sends the optimum modified regulating signal associated with point 1, which is stored in the memory S, to the tracking regulation circuit. This signal is either the third or the fourth modified regulating signal.

If the third modified regulating signal is stored in the memory S as the optimum modified regulating signal, then the light beam moves from point 1 to point 8 on data track C, then to point 9 on data track C and from there to point 10 on the data track B which is to be scanned.

On the other hand, the light beam moves from point 2 to point 11 on data track A, on further to point 12 on data track A and from there to point 13 on the data track B, which is to be scanned, if the fourth modified regulating signal is stored in the memory S as the optimum modified regulating signal.

The quantity of data which has not been scanned, as can be seen from FIG. 2, is considerably reduced by using the optimized regulating signal.

The extent by which the quantity of unscanned data is reduced mainly depends on the size and shape of the contaminated or damaged spots on the disc. The method explained by way of the example of the grain of dust SK is performed at all the contaminated or damaged spots on the disc.

It has been found that the time required for executing the method may be considerably shortened if during the iterative process the rotational speed of the disc is increased while the optimum modified regulating signal is being determined. In addition provision is included to permit the operator to enable or disable the process according to ones inclination.

Further, provision is made for the addresses of any points and the associated modified regulating signals to be automatically deleted in the memory if the light beam no longer loses the data track at these points. This may occur if, for example, the user has carefully cleaned the disc to remove contamination and fingerprints.

A further alternative offers the operator the possibility of manually deleting the addresses and the associated modified regulating signals in the memory at any time.

This invention anticipates that defects in disc may be determined during manufacture. In this instance the manufacturer of the discs may provide the addresses of the contaminated or damaged spots as well as the associated modified regulating signals for each identified disc. This data may be recorded on the disc or it may be provided in a separate medium.

For example the discs may be packaged in a magazine (cartridge) with an identification which characterizes them as belonging to the magazine. The addresses of the points and the associated modified regulating signals are stored in order according to discs and magazine.

As the spots where the light beam loses the data track are in most cases contaminated by dust or fingerprints, it is advisable to alert the operator to clean a disc by means of an visual and/or acoustic signal if there are more than a predetermined locations of the disc where the light beam mistracks. A criterion for establishing when the disc should be cleaned could be, for example, the content of the memory. The visual and/or acoustic signal can be generated as soon as a particular number of addresses of mistracking locations are stored in the memory. For example, the text "Clean disc" may be arranged to appear on a visual display.

The invention is suitable for playback devices which scan a disc-type rotating recording medium in a contactless manner. Examples of this are CD players, video-disc players, DRAW-disc players and magneto-optical recording and reproducing devices.

What is claimed is:

1. A method for reading data recorded in helical data tracks or concentric circles on a rotating disc-type recording medium, using a tracking regulation circuit to guide a scanning device along the data tracks; storing in memory track addresses of points where the scanning device loses tracking ability; and calculating and generating, in the track regulating circuit, a first tracking error (TE) signal to guide the scanning device back onto the data track to be scanned, improvements comprising:
   a. detecting occurrences of said scanning device losing tracking ability and storing track addresses of points where the scanning device lost tracking ability;
   b. calculating a first modified TE signal from the first TE signal to condition the track regulating circuit to remain operable;
   c. storing the first modified TE signal in memory in relation to a corresponding track address of a point where the scanning device lost tracking ability;
   d. accessing from memory said first modified TE signal when the track address of a point where the scanning device lost tracking ability is subsequently scanned, and applying this value to the tracking regulation circuit; and
   e. after application of said first modified TE signal to the tracking regulation circuit, determining the location of the scanning device and if the scanning device is not tracking a desired data track, conditioning the tracking regulation circuit to return the scanning device to the desired data track which is to be scanned.

2. A method according to claim 1 further comprising:
   f. generating a second TE signal to guide the scanning device onto the data track to be scanned;
   g. calculating a second modified TE signal from the second TE signal to condition the track regulating circuit to remain operable;
   h. storing the second modified TE signal in memory in relation to the corresponding track address of the point where the scanning device loses tracking ability;
   i. repeating steps f, g, and h to determine an optimal modified TE signal, or optimal sequence of modified TE signals, at a predetermined time with respect to a reversal of the tracking deviation;
   j. storing said optimal modified TE signal in memory;
   k. accessing from memory said optimal modified TE signal when the track address of a point where the scanning device lost tracking ability is subsequently scanned and applying this value to the tracking regulation circuit; and
   l. after application of said optimal modified TE signal or optimal sequence of modified TE signals, determining the location of the scanning device and if the scanning device is not tracking a desired data track, conditioning the tracking regulation circuit to return the scanning device to the data track which is to be scanned.

3. A method according to claim 2, further comprising:
   altering the rotational speed of the rotating disc-type recording medium during calculation of said optimal modified TE signal.

4. A method according to claim 1 further including:
   providing operator engagement and disengagement of the method.

5. A method according to claim 1 further comprising:
   automatically deleting track addresses and corresponding first modified TE signal of each point which no longer causes the scanning device to lose the data track.

6. A method according to claim 2 further comprising;
   automatically deleting the track address and corresponding optimal modified TE signal of each point which no longer causes the scanning device to lose the data track.

7. A method according to claim 1 including:
providing operator deletion of any data present in said memory at any time.

8. A method according to claim 1 further comprising:
f. during a manufacturing process, storing track addresses of points where the scanning device loses tracking ability;
g. during said manufacturing process, storing the first modified TE signals for each point where the scanning device loses tracking ability in correspondence with the associated track address; and
h. providing each rotating disc-type recording medium with an identification number and associating the identification number with the track addresses of the points where the scanning device lost tracking ability and the corresponding first modified TE signals determined during said manufacturing process.

9. A method according to claim 2 further comprising:
m. during a manufacturing process, storing track addresses of points where the scanning device loses tracking ability;
n. during said manufacturing process, storing the optimal modified TE signals for each point where the scanning device loses tracking ability in correspondence with the associated track address; and
o. providing each rotating disc-type recording medium with an identification number and associating the identification number with the track addresses of the points where the scanning device lost tracking ability and the corresponding optimal modified TE signals determined during said manufacturing process.

10. A method according to claim 1 further comprising:
f. providing each rotating disc-type recording medium in a magazine with a unique identification number;
g. providing each magazine with a unique identification number;
h. storing track addresses of points where the scanning device loses tracking ability and their associated first modified TE signals with reference to the corresponding rotating disc-type recording medium and magazine.

11. A method according to claim 2 further comprising:
m. providing each rotating disc-type recording medium in a magazine with an identification number;
n. providing each magazine with an identification number;
o. storing track addresses of points where the scanning device loses tracking ability and their associated optimal modified TE signals with reference to the corresponding rotating disc-type recording medium and magazine.

12. A method according to claim 1 further comprising:
f. determining when the system has detected a number of defects exceeding a number that precludes non-objectionable reproduction of the data; and
g. displaying an indication that the disc-type recording medium needs cleaning.

* * * * *